United States Patent [19]

Miyamae et al.

[11] Patent Number: 4,637,690

[45] Date of Patent: Jan. 20, 1987

[54] TELECENTRIC ZOOM LENS SYSTEM

[75] Inventors: Hiroshi Miyamae, Koganei; Makoto Banno, Hachioji, both of Japan

[73] Assignee: Konishiroku Photo Industry Co., Ltd., Tokyo, Japan

[21] Appl. No.: 365,646

[22] Filed: Apr. 5, 1982

[30] Foreign Application Priority Data

Apr. 6, 1981 [JP] Japan .................................. 56-50514
Apr. 14, 1981 [JP] Japan .................................. 56-55038

[51] Int. Cl.⁴ .............................................. G02B 15/16
[52] U.S. Cl. ..................................... 350/427; 350/415; 350/450
[58] Field of Search ............... 350/415, 423, 427, 450

[56] References Cited

U.S. PATENT DOCUMENTS

| | | | |
|---|---|---|---|
| 3,316,051 | 4/1967 | Baluteau | 350/423 X |
| 3,549,230 | 12/1970 | Kato et al. | 350/519 |
| 3,918,798 | 11/1975 | Takano | 350/427 |
| 4,249,805 | 2/1981 | Hilbert et al. | 350/415 X |

Primary Examiner—John K. Corbin
Assistant Examiner—Scott J. Sugarman
Attorney, Agent, or Firm—Jordan B. Bierman

[57] ABSTRACT

As a projection optical system for a measuring projector, a telecentric optical system is required, and, moreover, it is advantageous when a zoom lens system is utilized. The present invention provides a telecentric zoom lens system to be used with a measuring projector wherein an iris is arranged between the lens groups to be moved for variation of magnification and wherein the iris is also moved at the time of zooming in order to prevent increase in the diameter of the front lens and increase in distortion which are caused when the telecentric character is given to a known zoom lens system.

To arrange the iris between a second and third lens groups in a zoom lens system comprising four lens groups respectively having positive, negative, positive and positive powers and to enable to move the iris integrally with the third positive lens group, it is preferable to add a negative lens group between the two positive lens groups, i.e., the third and fourth lens groups, so that the zoom lens system comprises five lens groups respectively having positive, negative, positive, negative and positive powers, and to move the added fourth lens group so that it becomes telecentric in respect to the iris, which is fixed to and at the front of the third lens group.

10 Claims, 14 Drawing Figures

FIG. 10
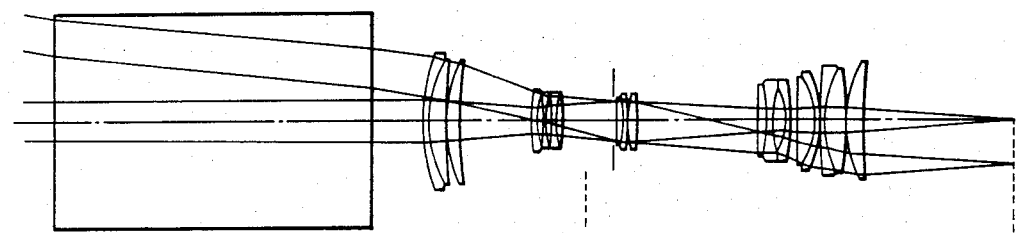
(10×)
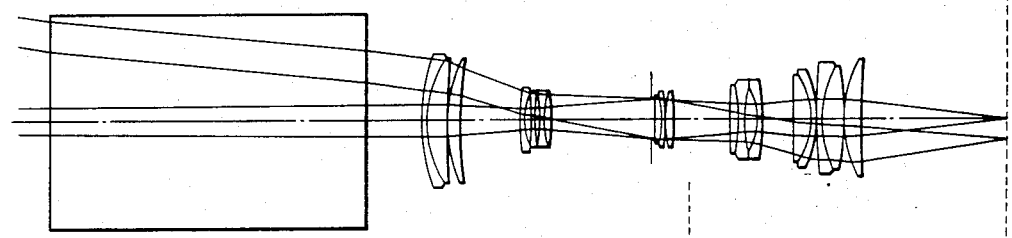
(20×)
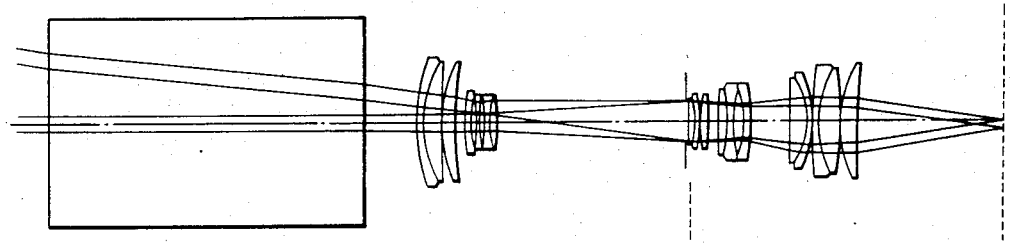
(50×)

FIG. 11
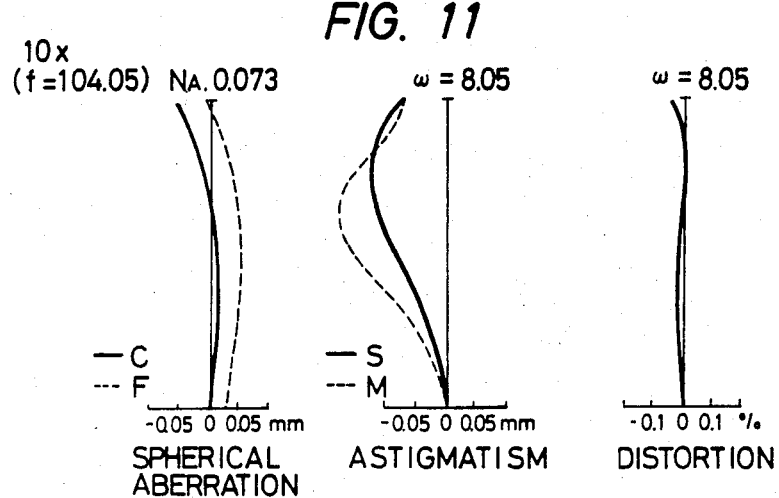
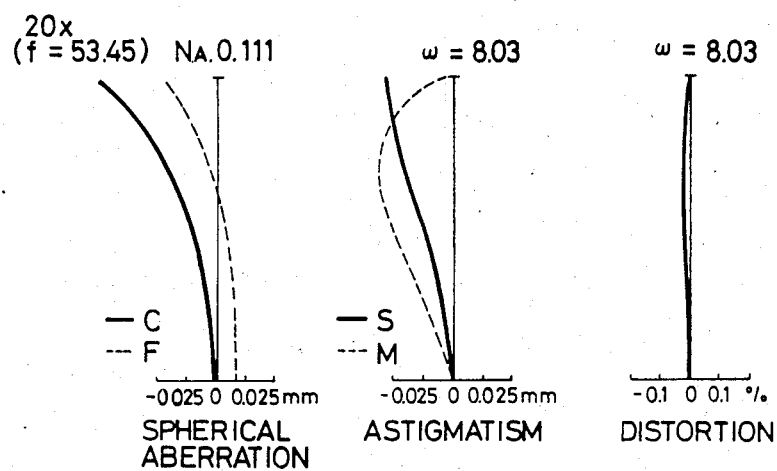
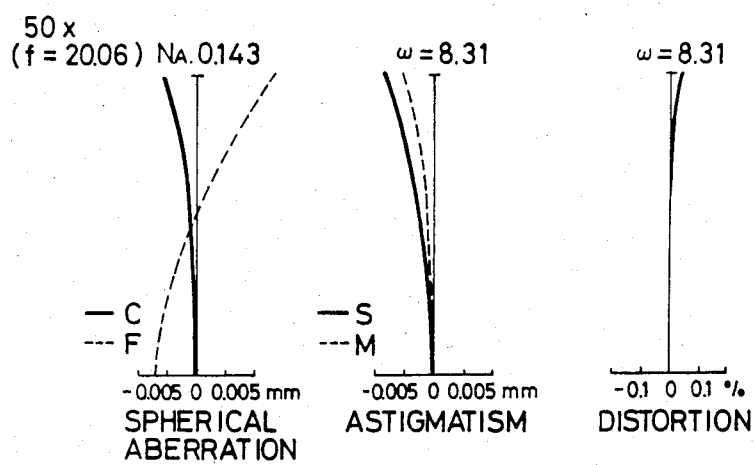

FIG. 13
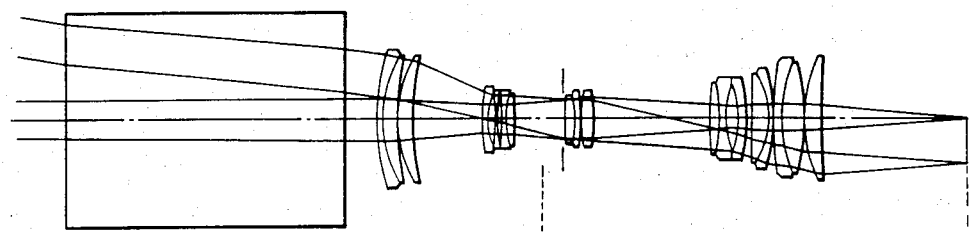
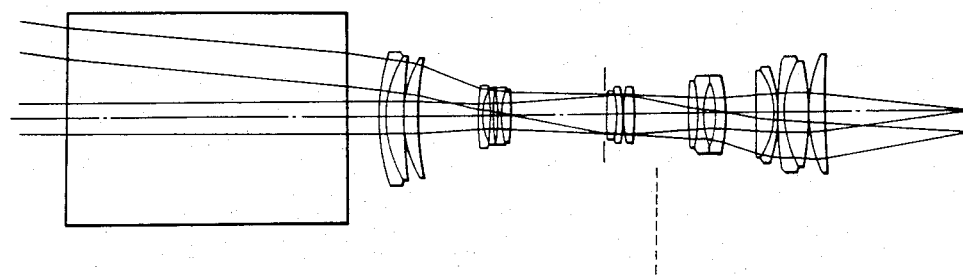
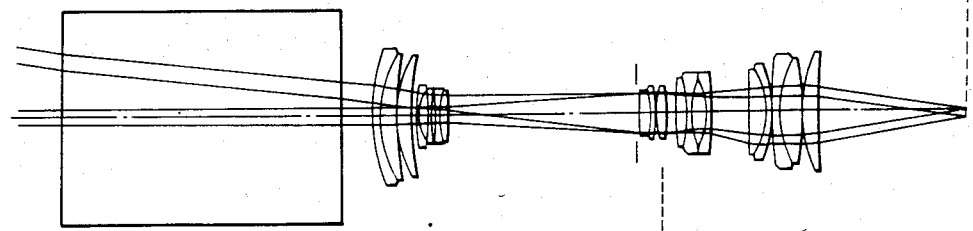

FIG. 14
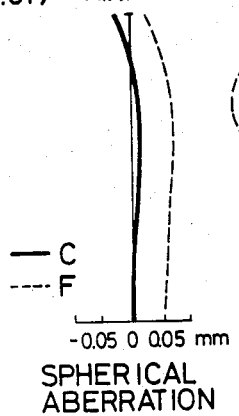
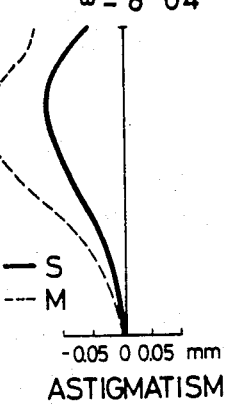
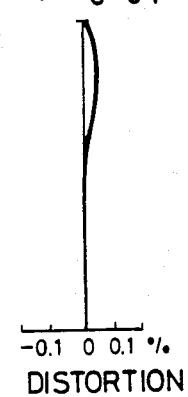
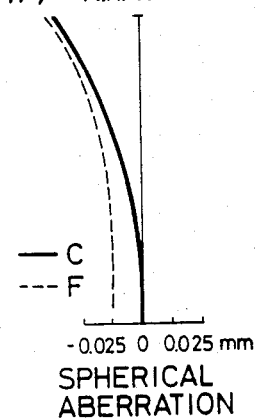
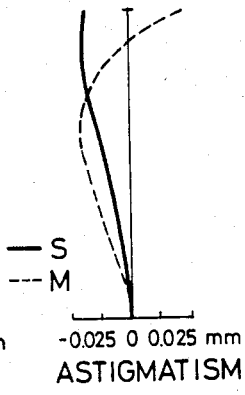
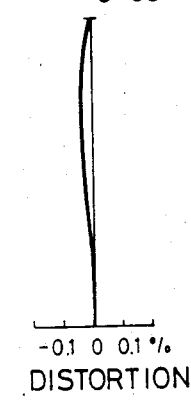
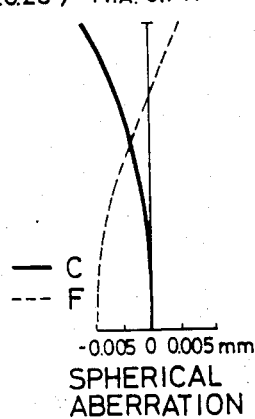
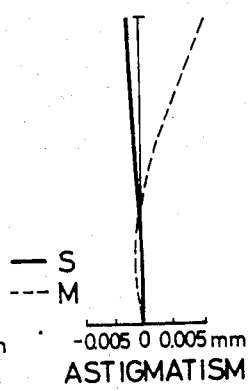
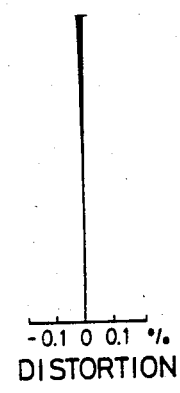

TELECENTRIC ZOOM LENS SYSTEM

BACKGROUND OF THE INVENTION (a) Field of the invention

The present invention relates to a telecentric zoom lens system for a measuring projector of which the diameter of the front lens is small, distortion is extremely small over a wide range of variation of magnification, and aperture ratio is large.

(b) Description of the prior art

A measuring projector is a measuring instrument of which the main purpose is to measure various values by illuminating the profile of an object to be measured by a suitable means, projecting the profile onto a screen enlarging it by means of a projection optical system of which aberrations, especially distortion, are corrected favourably, and making comparison with a reference figure on the screen. For the optical system to be used for the above-mentioned purpose, extremely high level of correction of distortion is required due to the character thereof and, moreover, such optical system should be arranged as a so called telecentric optical system, with which the principal ray on the object side of the rays which pass through the optical system becomes parallel with the optical axis in order to ensure the optical magnification accuracy at the time of focusing on the screen surface by moving the stage upward and downward. Besides, the optical system should have a high aperture efficiency because it is desirable that the luminance of the image is uniform over the whole area on the screen from the central portion to the marginal portion.

As the requirements for the optical system are strict as described in the above, these requirements are fulfilled at present by using a plural number of lens systems, which are individually designed to have fixed focal lengths suitable for respective magnifications, according to the purpose of application. Therefore, to change the magnification halfway during the measurement, it is indispensable to prepare a plural number of lenses with individually different magnifications, and it is essential to mount and dismount those lenses to the measuring projector as required or to exchange the lenses by a turret when the measuring projector is provided with the turret.

If it is possible to replace the above-mentioned plural number of lenses for a measuring projector with one zoom lens having sufficient vari-focal ratio, troublesome steps when changing over the magnification can be reduced, and, moreover, it is possible to make the measuring device as a whole compact and to reduce the total cost.

Besides, a zoom lens system enables to continuously vary the magnification by keeping the focusing plane fixed and, therefore, it is possible to observe and measure the shape of the object at any magnification in the range of variation of magnification of the zoom lens system.

However, almost no zoom lens system to be used for the above-mentioned purpose has been put to practical use. This is due to the reason that the tolerance in distortion required for this kind of optical system is small as explained before, and a technique for limiting distortion to a value within the tolerance has not yet been established for zoom lens systems, for which it has been considered to be especially difficult to correct distortion. Another reason is that the conventional method for giving the telecentric character to zoom lens systems has such effect that results in increase in the diameter of the front lens and, consequently, a compact optical system cannot be obtained and unfavourable influence is caused also to the aperture efficiency.

That is, known telecentric zoom lens systems are arranged that, in order to fulfill the condition for attaining the telecentric character, the zoom lens system comprises a varifocal lens system and master lens system, and an iris is arranged at the position of front focal point of the master lens system, which is a fixed lens group. Therefore, such zoom lens system does not comprise a lens group which is located in the rear of the iris and moved along the optical axis according to variation of magnification. For the above-mentioned type of zoom lens system, the diameter of the front lens should be made larger especially in the long focal length position when the moving range of movable lens group located in front of the iris is made larger in order to obtain high vari-focal ratio and, when it is attempted to make the diameter of the front lens small by keeping the varifocal ratio unchanged, it becomes necessarily impossible to ensure a sufficient field angle.

There is a known zoom lens system comprising, for example, four lens groups respectively with positive, negative, positive and positive powers and arranged that the first and fourth lens groups are fixed while the second and third lens groups move along the optical axis in monotone patterns according to variation of magnification from the long focal length position to the short focal length position, the second lens group moving toward the first lens group at that time and the third lens group moving toward the direction opposite to the movement of the second lens group (for example, the lens system disclosed in Japanese published examined patent application No. 12424/76). With this type of zoom lens system, magnifications of the movable lens groups vary respectively in monotone patterns and variations of magnifications of respective movable lens groups effectively contribute to variation of magnification of the lens system as a whole, and it is therefore possible to make the movement amounts of respective lens groups small, and variations of aberrations during variation of magnification are small. Therefore, this type of zoom lens system is widely known as a type advantageous for arranging a high vari-focal ratio zoom lens system.

When arranging the above-mentioned type of zoom lens system as a telecentric optical system, an iris is generally arranged at the position of front focal point of the fourth lens group, which is a fixed lens group, as shown in FIG. 1. However, this arrangement causes a disadvantage that the entrance pupil comes toward the rear side (image side) when the zoom lens system is in the long focal length position. Generally, one of characteristics of projection optical systems is that the field angle does not become largely different even when the optical system has either a long focal length or short focal length. The diameter of the front lens thereof is determined chiefly by the position of the entrance pupil of the optical system. Therefore, in case of a zoom lens system arranged as described in the above, the diameter of the front lens becomes large when the entrance pupil in the long focal length position comes toward the rear side going away from the front lens. In other words, it is more advantageous when the iris is arranged at a position as close as possible to the front side. However, as far as the iris is located between the third and fourth lens groups, the position of the iris is limited to the range where the iris does not interfere with the third lens group when the zoom lens system is in the short focal length position where the third lens group comes closest to the fourth lens group. Besides, it is also advantageous for making the diameter of the front lens small when the focal length of the fourth lens group, which is the master lens group, is made long so that the inclination of the principal ray passing the center of the iris becomes small. In that case, however, such disadvantages are caused that the overall length of the lens system becomes long or the working distance becomes short. As explained so far, with the known method to fix the telecentric iris at the position of the front focal point of the master lens system, it is impossible to obtain an optical system which fully satisfies the requirements.

PRINCIPLE OF THE INVENTION

It is, therefore, a primary object of the present invention to provide a new type of telecentric zoom lens system comprising at least one movable lens group, which is arranged in the rear of the iris and moves along the optical axis according to variation of magnification, the new type of telecentric zoom lens system being thereby made free from the above-mentioned disadvantages of known telecentric zoom lens systems.

In case of the above-mentioned new type of telecentric zoom lens system, a movable lens group to be moved for variation of magnification can be arranged in the rear of the iris as well as a movable lens group called a compensator which does not contribute to variation of magnification. This largely relaxes the known restrictions imposed on the design of lens systems in order to fulfill the condition for attaining the telecentric character. As the design of zoom lens systems for measuring projectors are subject to strict requirements such as a high vari-focal ratio, and small diameter of front lens, the above-mentioned relaxation of restrictions imposed on the design is very effective for materializing this type of telecentric zoom lens system.

For easier understanding of the basic composition of the zoom lens system according to the present invention, it is explained below in the case that thin lens groups exist on the rear side of the iris. To keep this lens system always telecentric during variation of magnification, it is essential that the iris is kept at the position of the front focal point of the lens groups arranged on the rear side of the iris always during variation of magnification. Here, meanings of the terms "front side" and "rear side" are as explained below. That is, in case of an optical system telecentric toward the object side, the rear side means the object side of the optical system while the front side means the image side. In case of an optical system telecentric toward the image side, the front side means the object side of the optical system while the rear side means the image side.

At first, in case that the rear lens groups located on the rear side of the iris are arranged as only one thin lens group, the condition for attaining the telecentric character is expressed by the following formula, where reference symbol d ($>0$) represents the distance between the iris and rear lens groups, and reference symbol f represents the focal length of the rear lens groups.

$$d = f \quad (1)$$

It is essential that the formula (1) is always fulfilled during variation of magnification. This means that the iris and rear lens group located on the rear side of the iris integrally move along the optical axis, during variation of magnification, so that the airspace d is always kept at a constant value. FIG. 2 shows a composition example with a thin lens group. Specifications of this lens system and values of ray tracing for the paraxial ray and paraxial principal ray are as shown below.

Composition example 1, with thin lens $f = 1.0$ Vari-focal ratio by lens group on the rear side of iris: 5.00 times $d = 1.0$

| | $f_B$ and values of paraxial ray tracing in respective positions | | |
|---|---|---|---|
| $f_B$ | T-Position Th15.0000 | M-Position 1.30000 | W-Position 1.10000 |
| $h_0$ | 1.00000 | 1.00000 | 1.00000 |
| $\beta_0$ | −0.50000 | −0.30000 | −0.10000 |
| $h_1$ | 1.50000 | 1.30000 | 1.10000 |
| $\beta_1$ | 1.00000 | 1.00000 | 1.00000 |
| $\underline{h}_0$ | 0.00000 | 0.00000 | 0.00000 |
| $\overline{\beta}_0$ | 1.00000 | 1.00000 | 1.00000 |
| $\underline{h}_1$ | −1.00000 | −1.00000 | −1.00000 |
| $\overline{\beta}_1$ | 0.00000 | 0.00000 | 0.00000 |
| M | −0.50000 | −0.30000 | −0.10000 | where,
 f: Focal length of lens group
 d: Airspace between iris and lens group
 $f_B$: Back focal length
 $h_0$: Height of paraxial axial ray on iris surface
 $\beta_0$: Inclination angle of paraxial axial ray between iris and lens group
 $h_1$: Height of paraxial axial ray on lens group
 $\beta_1$: Inclination angle of paraxial axial ray on the rear side of lens group
 $\underline{h}_0$: Height of paraxial principal ray on iris surface
 $\overline{\beta}_0$: Inclination angle of paraxial principal ray between iris and lens group
 $\underline{h}_1$: Height of paraxial principal ray on lens group
 $\overline{\beta}_1$: Inclination angle of paraxial principal ray on the rear side of lens group
 M: Magnification by lens group on the rear side of iris Now, in case that the rear lens groups located on the rear side of the iris are arranged as two thin lens groups, i.e., the first lens group and second lens group, the distance l from the front focal point of the partial lens system consisting of the two lens groups on the rear side of the iris to the first lens group is expressed by the formula shown below, where reference symbol $d_1$ ($>0$) represents the airspace between the iris and the first lens group, reference symbol $d_2$ ($>0$) represents the airspace between the first and second lens groups, reference symbol $f_B$ ($>0$) represents the back focal length, reference symbol $f_1$ represents the focal length of the first lens group, and reference symbol $f_2$ represents the focal length of the second lens group.

$$l = \frac{f_1(f_2 - d_2)}{f_1 + f_2 - d_2} \quad (2)$$

When $l = d_1$, the condition for attaining the telecentric character for this lens system is obtained as shown below.

$$d_1 = \frac{f_1(f_2 - d_2)}{f_1 + f_2 - d_2} \quad (3)$$

FIG. 3 shows a composition example in which the first lens group, out of the two lens groups located on the rear side of the iris, is arranged as a negative lens group and the second lens group is arranged as a positive lens group. According to variation of magnification, the negative lens group moves forward and backward along the optical axis, the positive lens group is fixed, and the iris moves along the optical axis, during variation of magnification, by always keeping its position at the front focal point of the partial lens system consisting of the above-mentioned two lens groups. Specifications of this lens system and values of ray tracing for the paraxial axial ray and paraxial principal ray are as shown below.

Composition example 2, by paraxial rays $f_1 = -1.0$ Vari-focal ratio by lens groups on the rear side of iris: 1.33 times
$F_2 = 1.2$
$f_B = 2.0$

| Airspaces between lens groups and values of paraxial ray tracing in respective positions | | | |
|---|---|---|---|
| | T-Position | M-Position | W-Position |
| $d_1$ | 4.00000 | 1.50000 | 0.66667 |
| $d_2$ | 0.40000 | 0.60000 | 0.80000 |
| $h_0$ | 1.00000 | 1.00000 | 1.00000 |
| $\beta_0$ | 0.17778 | 0.31111 | 0.40000 |
| $h_1$ | 0.28889 | 0.53333 | 0.73333 |
| $\beta_1$ | −0.11111 | −0.22222 | −0.33333 |
| $h_2$ | 0.33333 | 0.66667 | 1.00000 |
| $\beta_2$ | 0.16666 | 0.33333 | 0.50000 |
| $\bar{h}_0$ | 0.00000 | 0.00000 | 0.00000 |
| $\bar{\beta}_0$ | 0.16667 | −0.33333 | 0.50000 |
| $\bar{h}_1$ | −0.66667 | −0.50000 | −0.33333 |
| $\bar{\beta}_1$ | 0.83333 | 0.83333 | 0.83333 |
| $\bar{h}_2$ | −1.00000 | −1.00000 | −1.00000 |
| $\bar{\beta}_2$ | 0.00000 | 0.00000 | 0.00000 |
| M | 1.06667 | 0.93333 | 0.80000 | where, $f_1$: Focal length of first lens group
$f_2$: Focal length of second lens group
$f_B$: Back focal length
$d_1$: Airspace between iris and first lens group
$d_2$: Airspace between first and second lens groups
$h_0$: Height of paraxial axial ray on iris surface
$\beta_0$: Inclination angle of paraxial axial ray between iris and first lens group
$h_1$: Height of paraxial axial ray on first lens group
$\beta_1$: Inclination angle of paraxial axial ray between first and second lens groups
$h_2$: Height of paraxial axial ray on second lens group
$\beta_2$: Inclination angle of paraxial axial ray on the rear side of second lens group
$\bar{h}_0$: Height of paraxial principal ray on iris surface
$\bar{\beta}_0$: Inclination angle of paraxial principal ray between iris and first lens group
$\bar{h}_1$: Height of paraxial principal ray on first lens group
$\bar{\beta}_1$: Inclination angle of paraxial principal ray between first and second lens groups
$\bar{h}_2$: Height of paraxial principal ray on second lens group
$\bar{\beta}_2$: Inclination of paraxial principal ray on the rear side of second lens group
M: Magnification by lens groups on the rear side of iris Now, in case that the rear lens groups located on the rear side of the iris are arranged as three thin lens groups, i.e., the first, second and third lens groups, the distance l from the front focal point of the partial lens system consisting of these three lens groups to the first lens group is expressed by the formula shown below, where reference symbol $d_1$ (>0) represents the airspace between the iris and the first lens group, reference symbol $d_2$ (>0) represents the airspace between the first and second lens groups, reference symbol $d_3$ (>0) represents the airspace between the second and third lens groups, reference symbol $f_B$ (>0) represents the back focal length, and reference symbol $f_i$ represents the focal length of ith lens group.

$$l = \frac{f_1\{(f_2 - d_2)(f_3 - d_3) - f_2 d_2\}}{f_2(f_1 - d_2) + (f_3 - d_3)(f_1 + f_2 - d_2)} \quad (4)$$

When $l = d_1$, the condition for attaining the telecentric character for this lens system is obtained as shown below.

$$d_1 = \frac{f_1\{(f_2 - d_2)(f_3 - d_3) - f_2 d_2\}}{f_2(f_1 - d_2) + (f_3 - d_3)(f_1 + f_2 - d_2)} \quad (5)$$

FIG. 4 shows a composition example in which, out of the three lens groups located on the rear side of the iris, the first lens group is arranged as a positive lens group, the second lens group is arranged as a negative lens group, and the third lens group is arranged as a positive lens group. According to variation of magnification, the first positive lens group and the second negative lens group move along the optical axis independently of each other, the third positive lens group is fixed, and the iris moves along the optical axis by always keeping its position, during variation of magnification, at the front focal point of the partial lens system consisting of the above-mentioned three lens groups. Specifications of this lens system and values of ray tracing for the paraxial axial ray and paraxial principal ray are as shown below.

Composition example 3, by paraxial rays $f_1 = 2.0$ Vari-focal ratio by lens groups on the rear side of iris: 13.00 times
$f_2 = -1.0$
$f_3 = 1.2$
$f_B = 2.0$

| Airspaces between lens groups and values of paraxial ray tracing in respective positions | | | |
|---|---|---|---|
| | T-Position | M-Position | W-Position |
| $d_1$ | 1.00000 | 0.40000 | 0.28571 |
| $d_2$ | 2.00000 | 1.00000 | 0.33333 |
| $d_3$ | 0.40000 | 0.60000 | 0.80000 |
| $h_0$ | 1.00000 | 1.00000 | 1.00000 |
| $\beta_0$ | −0.28889 | −0.13889 | −0.03389 |
| $h_1$ | 1.28889 | 1.05555 | 1.01111 |
| $\beta_1$ | 0.35558 | 0.38889 | 0.46667 |
| $h_2$ | 0.57778 | 0.66667 | 0.85556 |
| $\beta_2$ | −0.22222 | −0.27778 | −0.38889 |
| $h_3$ | 0.66667 | 0.83333 | 1.16667 |
| $\beta_3$ | 0.33333 | 0.41667 | 0.58333 |
| $\bar{h}_0$ | 0.00000 | 0.00000 | 0.00000 |
| $\bar{\beta}_0$ | 0.33333 | 0.41667 | 0.58333 |
| $\bar{h}_1$ | −0.33333 | −0.16667 | −0.16667 |
| $\bar{\beta}_1$ | 0.16667 | 0.33333 | 0.50000 |

-continued

| | Airspaces between lens groups and values of paraxial ray tracing in respective positions | | |
|---|---|---|---|
| | T-Position | M-Position | W-Position |
| $h_2$ | −0.66667 | −0.50000 | −0.33333 |
| $\beta_2$ | 0.83333 | 0.83333 | 0.83333 |
| $h_3$ | −1.00000 | −1.00000 | −1.00000 |
| $\beta_3$ | 0.00000 | 0.00000 | 0.00000 |
| M | −0.86667 | −0.33333 | −0.06667 | where,
- $f_1$: Focal length of first lens group
- $f_2$: Focal length of second lens group
- $f_3$: Focal length of third lens group
- $F_B$: Back Focal length
- $d_1$: Airspace between iris and first lens group
- $d_2$: Airspace between first and second lens groups
- $d_3$: Airspace between second and third lens groups
- $h_0$: Height of paraxial axial ray on iris surface
- $\beta_0$: Inclination angle of paraxial axial ray between iris and first lens group
- $h_1$: Height of paraxial axial ray on first lens group
- $\beta_1$: Inclination angle of paraxial axial ray between first and second lens groups
- $h_2$: Height of paraxial axial ray on second lens group
- $\beta_2$: Inclination angle of paraxial axial ray between second and third lens groups
- $h_3$: Height of paraxial axial ray on third lens group
- $\beta_3$: Inclination of paraxial axial ray on the rear side of third lens group
- $\overline{h_0}$: Height of paraxial principal ray on iris surface
- $\overline{\beta_0}$: Inclination of paraxial principal ray between iris and first lens group
- $\overline{h_1}$: Height of paraxial principal ray on first lens group
- $\overline{\beta_1}$: Inclination angle of paraxial principal ray between first and second lens groups
- $\overline{h_2}$: Height of paraxial principal ray on second lens group
- $\overline{\beta_2}$: Inclination angle of paraxial principal ray between second and third lens groups
- $\overline{h_3}$: Height of paraxial principal ray on third lens group
- $\overline{\beta_3}$: Inclination angle of paraxial principal ray on the rear side of third lens group
- M: Magnification by lens groups on the rear side of iris In the same way as explained so far, even when the lens groups on the rear side of the iris are arranged as four or more thin lens groups, it is possible to compose a new type of telecentric zoom lens system when the arrangements and movements of the iris and lens groups on the rear side of the iris are decided so that the iris is moved along the optical axis or is fixed in the state that the iris always keeps its position, during variation of magnification, at the front focal point of the partial lens system consisting of those lens groups.

Brief Description of the Drawings

FIGS. 5 and 6 respectively show explanatory drawings illustrating the composition of an embodiment of the telecentric zoom lens system according to the present invention;

FIG. 10 shows the states of rays of Embodiment 1 in respective positions during variation of magnification;

FIG. 11 shows graphs of aberration curves of Embodiment 1 in the above-mentioned respective positions during variation of magnification; and FIGS. 12, 13 and 14 respectively show a sectional view of Embodiment 2 of the telecentric zoom lens system according to the present invention, states of rays of Embodiment 2 in respective positions during variation of magnification, and graphs of aberration curves of Embodiment 2 in the above-mentioned respective positions.

DETAILED DESCRIPTION OF THE PREFERRED EMBODIMENTS

Figure 1:
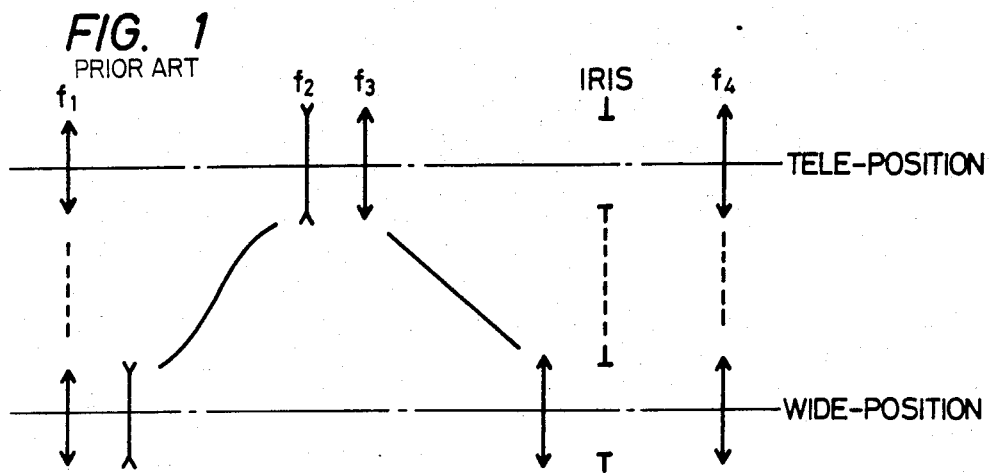
FIG. 1 shows an explanatory drawing illustrating the composition of a known telecentric zoom lens system.
Figure 2:
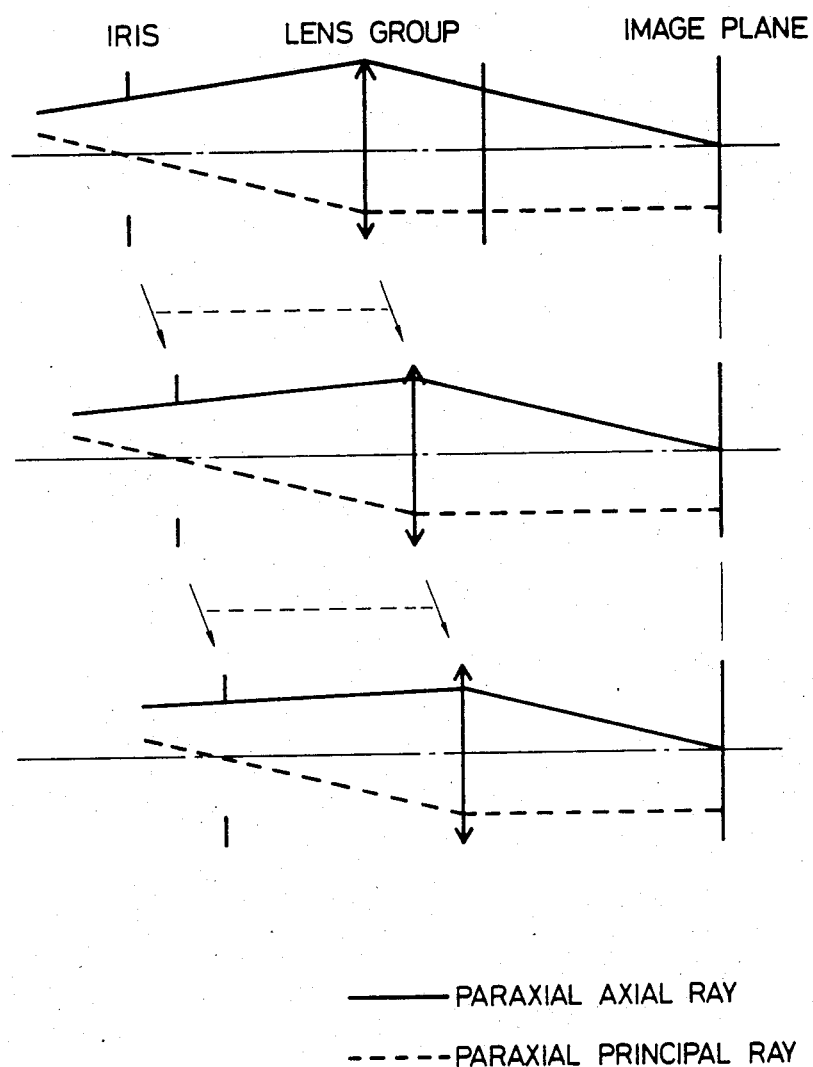
FIGS. 2, 3 and 4 respectively show explanatory drawings illustrating the basic composition of the telecentric zoom lens system according to the present invention.
Figure 3:
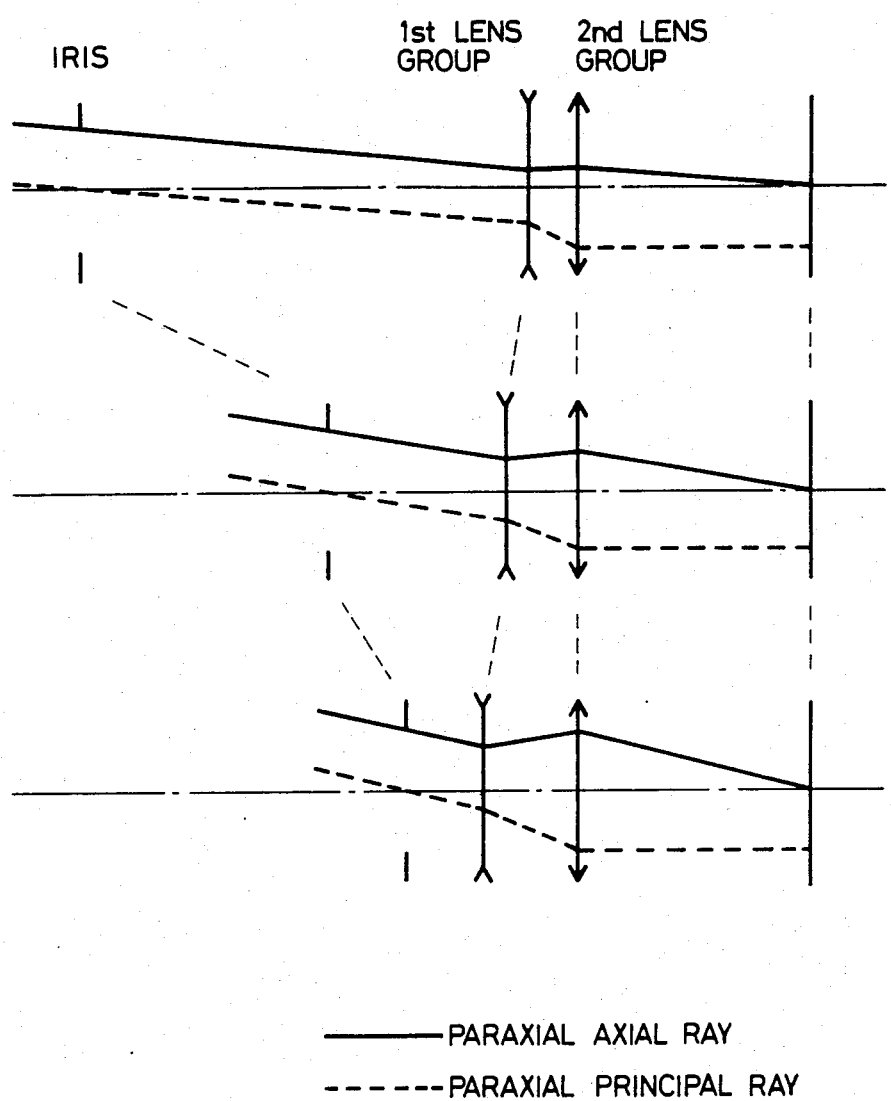
Figure 4:
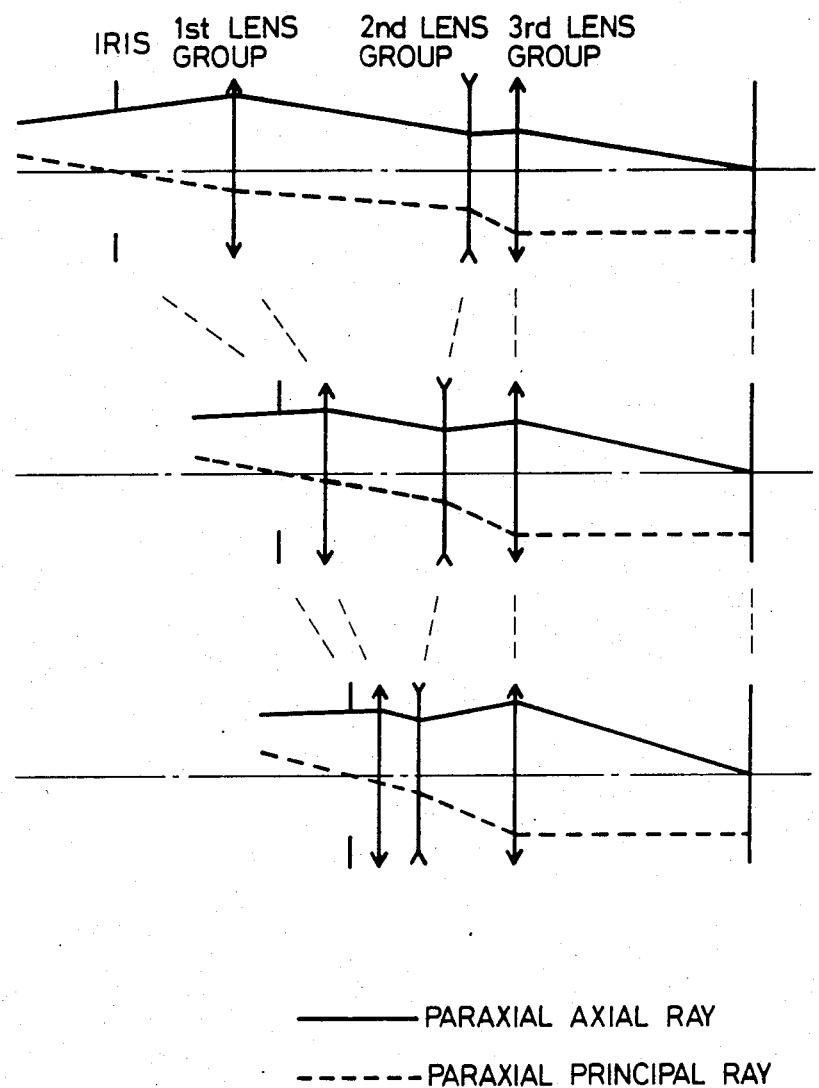

Preferred embodiments of the telecentric zoom lens system according to the present invention are described below.

When, with the afore-mentioned zoom lens system consisting of four lens groups of the first positive, second negative, third positive and fourth positive lens groups, it is attempted to arrange the iris between the second and third lens groups, i.e., on the other side of the third lens group, by applying the afore-mentioned principle of the present invention to it, the third lens group which is a movable lens group comes to a position behind the iris. Therefore, to fulfill the condition for attaining the telecentric character, it is impossible to fix the iris and it is necessary to locate the iris at the position of the front focal point of the partial lens system consisting of the third and fourth lens groups. Consequently, the iris should be moved along the optical axis, during variation of magnification, independently of the second and third lens groups which are movable lens groups.

For such zoom lens system, the relation expressed by the formulas shown below is obtained where the focal length of the third lens group is represented by reference symbol $f_3$, the focal length of the fourth lens group is represented by reference symbol $f_4$, the airspace between the third and fourth lens groups is represented by reference symbol d by ignoring the distance between the principal points of respective lens groups, the airspace between the third lens group and front focal point of the partial lens system consisting of the third and fourth lens groups is represented by reference symbol a, and airspace between the fourth lens group and said front focal point is represented by reference symbol b.

$$a = f_3 + \frac{f_3^2}{d - (f_3 + f_4)}$$

$$b = d + f_3 + \frac{f_3^2}{d - (f_3 + f_4)}$$

As far as the iris is arranged in front of the third lens group, the airspace a becomes a>0, and it is derived that b is a monotone increasing function of d and a is a monotone decreasing function of d. This relation is shown in FIG. 5.

When a movable telecentric iris is provided between the second and third lens groups of a zoom lens system consisting of four lens groups respectively with positive, negative, positive and positive powers as described in the above, the height of principal ray from the optical axis on the first lens group becomes low in each position during variation of magnification due to the fact that the iris is shifted forward. Besides, the position of the iris moves in a monotone pattern according to variation of magnification and, moreover, the moving direction of the iris at that time has an effect to cancel the large variation in the entrance pupil position to be caused by variation of magnification, said variation in the entrance pupil position being unavoidable in case of known type of telecentric zoom lens systems. Therefore, for a zoom lens system for a measuring projector of which the variation of field angle to be caused during variation of magnification should be small, this is advantageous because the diameter of the front lens can be effectively utilized in each position during variation of magnification and favourable influence is given also to the aperture efficiency.

On the other hand, however, the above-mentioned telecentric iris itself forms an independent movable element. Therefore, from the viewpoint of lens tube structure, this type of zoom lens system is equivalent to such zoom lens system comprising three movable lens groups and, consequently, the mechanical structure becomes complicated compared with the optical characteristics thereof. Besides, for a zoom lens system for which favourable correction of distortion is strictly required over a wide vari-focal range, it is preferable to arrange the lens system so that distortion caused on the front side of the iris and distortion caused on the rear side of the iris cancel each other in each position during variation of magnification. From this viewpoint, it is not advantageous to take this type of composition wherein the iris is arranged between the second and third lens groups of a zoom lens system comprising four lens groups respectively with positive, negative, positive and positive powers. Furthermore, though the two movable lens groups respectively bear the variation of magnification, the amounts of variation of magnification alloted to them are large and, consequently, variation of aberrations becomes large. This is disadvantageous for correction of aberrations such as distortion. Moreover, as the position of the iris is different from that of known zoom lens system, variation of aberration becomes very large especially on the rear side of the iris, the amount of negative distortion caused in the long focal length position tends to become too large, and it becomes difficult to correct it.

In the zoom lens system according to the present invention, the afore-mentioned telecentric iris is fixed to the third lens group so that it moves along the optical axis integrally with the third lens group according to variation of magnification, a lens group having negative power is newly added between the third and fourth lens groups by arranging that the newly added negative lens group is moved in the direction opposite to the moving direction of the third lens group as shown in FIG. 6, and the above-mentioned problems are solved thereby. The lens system obtained as a result of the above has five-group lens configuration with a positive, negative, positive, negative and positive lens groups and has the iris located at the position of the third lens group. Therefore, it ensures favourable symmetry between the lens groups on the front and rear sides of the iris and is arranged so that distortion caused by the lens groups on the front side of the iris is cancelled by distortion caused by the lens groups on the rear side of the iris. Besides, variation of magnification alloted to the second and third lens groups in the known lens system is now alloted also to the fourth lens group. Therefore, the vari-focal ratio alloted to each lens group is now reduced and, at the same time, it is possible to reduce the variation of aberrations caused by respective lens groups during variation of magnification. Moreover, in the known lens system with four-group lens configuration, distortion is corrected in the following method. That is, large positive distortion caused by the first lens group is corrected by the second negative lens group, and variation of distortion during variation of magnification is reduced thereby. In case of lens configuration of the lens system according to the present invention, it is possible to apply the above-mentioned correcting method also to the lens groups on the rear side of the iris during variation of magnification.

To fulfill the condition for attaining the telecentric character with the lens system having the above-mentioned new composition, the position of the image of the iris, which moves together with the third lens group, formed by the fourth lens group should be always kept at the position of the front focal point of the fifth lens group in respective positions during variation of magnification because the fifth lens group is a fixed lens group. When the distance between the iris and third lens group is ignored and it is assumed that the position of the third lens group, i.e., the position of the iris, coincides with the position of the principal point of the fourth lens group when the zoom lens system is in the short focal length position, the above-mentioned condition is expressed by the following formula, where reference symbol p represents the amount of movement of the iris from the above-mentioned position when the zoom lens system is put to each position during variation of magnification, reference symbol q represents the amount of movement of the fourth lens group from the above-mentioned position when the zoom lens system is put to each position during variation of magnification, and reference symbol $f_4 (>0)$ represents the focal length of the fourth lens group. FIG. 6 shows the loci of movements of the iris and fourth lens group.

$$p = -q + |f_4| - \frac{|f_4|^2}{q + |f_4|}$$

This means that, when the position of the third lens group and iris vary linearly along the optical axis during variation of magnification, the fourth lens group which is a negative lens group moves in a monotone pattern in the direction opposite to the movement of the third lens group. The above-mentioned moving direction of the fourth lens group coincides with the direction in which the fourth lens group moves in order to newly contribute to variation of magnification. Therefore, it is possible to obtain a telecentric zoom lens system, which is an object of the present invention, when the third and fourth lens groups are moved so that the condition for attaining the telecentric character is fulfilled and, at the same time, the second lens group is moved relatively with the third and fourth lens groups also in a monotone pattern so that the image plane is thereby kept fixed in the same position during variation of magnification.

When a telecentric zoom lens system having the basic composition described so far is designed actually, the principal ray passing through the center of the iris does not always become parallel with the optical aixs after passing through the lens system, depending on the states of aberrations of the partial lens system on the rear side of the iris, even when the condition for attaining the telecentric character is perfectly fulfilled regarding the paraxial rays at the time of the design. When the states of aberrations of the partial lens system on the rear side of the iris generally vary according to variation of magnification as in case of the lens system according to the present invention, the principal ray shows complicated variation.

Generally, however, it is all right to consider that the condition for attaining the telecentric character always has a certain range of tolerance though it may differ with the purpose and application of the lens system. Therefore, even when the condition for attaining the telecentric character is not fulfilled strictly regarding the paraxial rays, depending on the circumstances concerning the movements or the like of respective lens groups and iris during variation of magnification, it is sufficient for practical use as far as the lens system fulfills a condition approximately similar to the condition for attaining the telecentric character.

Figure 7:
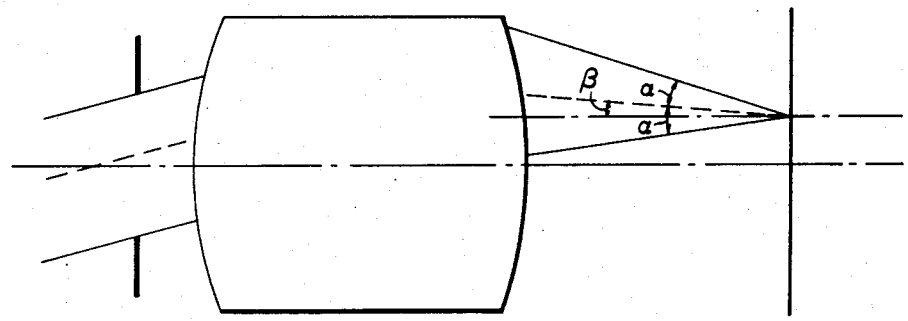
FIG. 7 shows an explanatory drawing for the condition for attaining the telecentric character.

FIG. 7 shows a meridional section illustrating the rays in the space on the object side or space on the image side for which the telecentric character is required. Here, reference symbol $\alpha$ represents the half angle of the rays in this section, and reference symbol $\beta$ represents the angle between the optical axis and central ray of the above-mentioned rays which equally bisects the converging angle of the rays.

For the optical system, the condition for attaining the telecentric character is required for the purpose of keeping the height of the central portion of rays on the object surface or image surface at a constant value even when the object surface or image surface causes defocusing, in the direction of optical axis, in the space on the object side or space on the image side for which the telecentric character is required. Therefore, it is all right when the central ray of rays is approximately parallel with the optical axis.

Generally, it is all right for practical use when the absolute value of the angle $\beta$ between the central ray of rays and optical axis is not larger than 50% of the half angle $\alpha$ of the converging angle of rays in each position during variation of magnification and at each image height. Therefore, it is possible to define the range of tolerance of the condition for attaining the telecentric character as expressed by the following formula.

$$|\beta|/\alpha < 0.5 \tag{1}$$

Figures 8, 9:
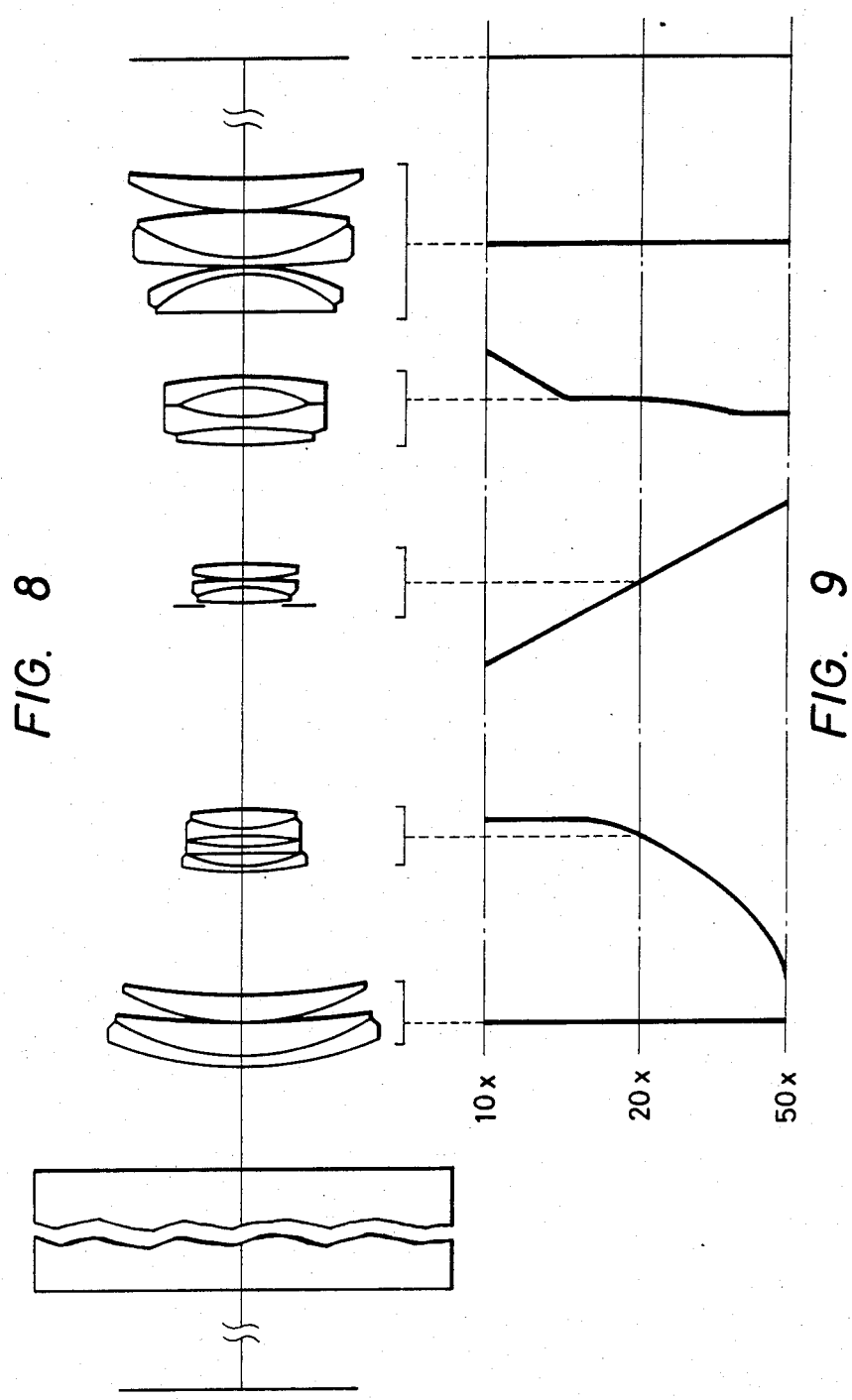
FIG. 8 shows a sectional view of Embodiment 1 of the telecentric zoom lens system according to the present invention.
FIG. 9 shows a graph illustrating the loci of movements of respective lens groups constituting Embodiment 1.

An example of an actual telecentric zoom lens system embodying the present invention is shown below. As shown in FIG. 8, this example is a zoom lens system for short distance which is designed so that the distance between the object and image becomes a limited constant value and which comprises five lens groups, i.e., a first positive lens group, second negative lens group, third positive lens group, fourth negative lens group and fifth positive lens group, wherein the first and fifth lens groups are kept fixed during variation of magnification, the second, third and fourth lens groups respectively move along the optical axis by respectively contributing to variation of magnification, and the iris moves integrally with the third lens group and is always kept, during variation of magnification, at a position near the position of the front focal point of the partial lens system comprising the third, fourth and fifth lens groups arranged on the rear side of the iris. FIG. 9 shows loci of movements of respective lens groups. Besides, the above-mentioned example zoom lens system is arranged to fulfill the following conditions:

$$1.5 < f_3/f_W < 3.0 \tag{2}$$

$$1.0 < |f_2|/f_W < 2.0 \tag{3}$$

$$1.0 < |f_4|/f_W < 2.0 \tag{4}$$

where,
$f_W$: Focal length of zoom lens system as a whole in short focal length position (wide position)
$f_i$: Focal length of ith lens group.

Out of the conditions shown in the above, the condition (2) is to define the movement amount of the third lens group and, consequently, of the iris and is required in order to minimize the variation in the position of the entrance pupil and to make the overall length of the lens system short. If $f_3/f_W$ becomes smaller than the lower limit of the condition (2) and the refractive power of the third lens group becomes strong, the movement amount of the third lens group becomes small and, therefore, the variation in the position of the entrance pupil increases. As a result, the diameter of the front lens becomes large and aperture efficiency decreases. Besides, variations of aberrations of the partial lens systems on the front side and rear side of the iris become large at the time of variation of magnification, and it becomes difficult to correct distortion favourably. If, on the contrary, $f_3/f_W$ becomes larger than the upper limit of the condition (2) and the refractive power of the third lens group becomes weak, the movement amount of the third lens group becomes large and, consequently, it becomes difficult to make the overall length of the lens system short enough to arrange the lens system compactly.

The conditions (3) and (4) are to define the movement amounts of the second and fourth lens groups and to minimize the variations of aberrations to be caused by the partial lens systems on the front side and rear side of the iris during variation of magnification, in cooperation with the condition (2), in order to thereby obtain sufficient varifocal ratio by small movement amounts of lens groups and, at the same time, to prevent the difficulty in correction of aberrations to be otherwise caused by increase of refractive powers.

To say concretely, the zoom lens system which fulfills the above-mentioned conditions is arranged as such zoom lens system wherein the first lens group comprises a doublet and a positive single lens, said doublet consisting of a positive single lens and a negative single lens; the second lens group comprises at least two negative single lenses and a doublet, which consists of a positive single lens and a negative single lens; the third lens group comprises a doublet and a positive single lens, said doublet consisting of a positive single lens and a negative single lens; the fourth lens group comprises a doublet and a negative single lens, said doublet consisting of a positive single lens and a negative single lens; and the fifth lens group comprises at least two doublets and a positive single lens, each of said doublet consisting of a positive single lens and a negative single lens; said zoom lens system being arranged to further fulfill the following conditions:

$$\bar{n}_2 > 1.75 \quad (5)$$

$$\bar{\nu}_5 > 45 \quad (6)$$

where,
$\bar{n}_2$: Mean value of refractive indices of lenses constituting second lens group
$\bar{\nu}_5$: Mean value of Abbe's numbers of lenses constituting fifth lens group The condition (5) is to secure the refractive power of the second lens group under the condition (3) without causing difficulty to correction of aberrations. If it is attempted to give satisfactory vari-focal ratio to the second lens group in the state that $\bar{n}_2$ is smaller than the lower limit of the condition (5), Petzval's sum of the lens system as a whole becomes insufficient, astigmatism becomes unfavourable and large barrel-type distortion occurs in the long focal length position.

The condition (6) relates to correction of chromatic aberration. Generally, for zoom lens systems, correction of chromatic aberration should be made for every lens group. In case of the zoom lens system according to the present invention, correction of chromatic aberration for the fifth lens group becomes a problem the aperture ratio in the short focal length position is large. Especially, correction of lateral chromatic aberration is important. If $\bar{\nu}_5$ becomes smaller than the lower limit of the condition (6), it becomes considerably difficult to correct lateral chromatic aberration in the short focal length position and, moreover, it becomes impossible to ignore the difference of distortion by colours.

Now, preferred embodiments of the telecentric zoom lens system according to the present invention are shown below. As each of these embodiments contains a prism in its optical system, correction of aberrations is made by including the prism.

Embodiments 1

(Lens groups are numbered in the order from the screen side.)
Focal length: 104.05–20.06
Magnification: 10X–50X
Vari-focal ratio: 5.0 times
N.A.: 0.07–0.14 (10X–50X)
Screen radius: 150 mm

|   |   | R | D | N | ν |
|---|---|---|---|---|---|
| 1 | Glass block | ∞ | 107.00 | 1.51633 | 64.1 |
| 2 |  | ∞ | 17.22 |  |  |
| 3 | First lens group | 64.845 | 1.70 | 1.80518 | 25.4 |
| 4 |  | 42.390 | 4.93 | 1.58913 | 61.1 |
| 5 |  | 140.576 | 0.20 |  |  |
| 6 |  | 41.085 | 4.80 | 1.58913 | 61.1 |
| 7 |  | 114.332 | (*1) |  |  |
| 8 | Second lens group | 46.393 | 1.00 | 1.77250 | 49.6 |
| 9 |  | 20.590 | 2.30 |  |  |
| 10 |  | −52.160 | 0.97 | 1.80610 | 40.9 |
| 11 |  | 34.774 | 1.90 |  |  |
| 12 |  | −62.194 | 1.00 | 1.71300 | 53.9 |
| 13 |  | 23.120 | 3.30 | 1.80518 | 25.4 |
| 14 |  | −54.372 | (*2) |  |  |
| Iris → |  |  |  |  |  |
| 15 | Third lens group | 81.608 | 2.50 | 1.58913 | 61.1 |
| 16 |  | −24.500 | 1.10 | 1.80518 | 25.4 |
| 17 |  | −165.546 | 0.20 |  |  |
| 18 |  | 48.618 | 2.73 | 1.51633 | 64.1 |
| 19 |  | −59.558 | (*3) |  |  |
| 20 | Fourth lens group | 108.070 | 2.82 | 1.80518 | 25.4 |
| 21 |  | −51.916 | 1.30 | 1.71300 | 53.9 |
| 22 |  | 28.798 | 5.50 |  |  |
| 23 |  | −20.844 | 1.30 | 1.58913 | 61.1 |
| 24 |  | −62.310 | (*4) |  |  |
| 25 | Fifth lens group | 883.446 | 6.10 | 1.71300 | 53.9 |
| 26 |  | −23.908 | 1.20 | 1.83400 | 37.2 |
| 27 |  | −36.694 | 0.20 |  |  |
| 28 |  | 200.244 | 1.20 | 1.83400 | 37.2 |
| 29 |  | 31.183 | 7.60 | 1.48749 | 70.1 |
| 30 |  | −99.761 | 0.20 |  |  |
| 31 |  | 38.744 | 5.50 | 1.69680 | 55.5 |
| 32 |  | 239.719 |  |  |  |

Distance between object and image: 1186.4 mm
Overall length of lens system: 272.4 mm
W.D. (including glass block): 50.6 mm
(*1)–(*4): Variables
Their values at respective magnifications are as shown below.

|  | (*1) | (*2) | (*3) | (*4) |
|---|---|---|---|---|
| 10X (f = 104.05) | 24.50 | 18.94 | 41.44 | 2.25 |
| 20X (f = 53.45) | 21.40 | 35.49 | 19.45 | 10.80 |
| 50X (f = 20.06) | 3.45 | 65.77 | 4.09 | 13.82 |

The glass block means the prism.
R: Radius of curvature of lens surface
D: Thickness of lens or airspace between lenses
N: Refractive index of lens for d-line (wavelength: 587.56 nm)
ν: Abbe's number
In the lens system shown in the above, the iris is located at the position of 0.5 mm in front of the third lens group and moves integrally with the third lens group during variation of magnification.

$$\frac{f_3}{f_W} = 2.242 \quad \bar{n}_2 = 1.774$$

$$\frac{|f_2|}{f_W} = 1.355 \quad \bar{\nu}_5 = 50.8$$

$$\frac{|f_4|}{f_W} = 1.436$$

FIG. 10 shows an explanatory figure illustrating the composition of the zoom lens system according to the above-mentioned Embodiment 1 and states of rays therein. That is, FIG. 10 shows the states of optical paths of rays which come from the object heights 0% (on the optical axis) and 100% on the object surface when the zoom lens system is in the positions of magnifications of 10X, 20X and 50X respectively. As it will be understood from this figure, the condition for attaining the telecentric character is substantially fulfilled in the space on the object side. Each dotted line in FIG. 10 shows the position of the front focal point of the partial lens system on the rear side of the iris.

The tables below show the values of the angle $\beta$ between the central ray of rays and optical axis in the space on the object side, values of the half angle $\alpha$ of the converging angle of rays in the space on the object side, and values of $\beta/\alpha$ respectively for the object heights of 0%, 30%, 50%, 70%, 90% and 100% when the zoom lens system is in the positions of respective magnifications.

| Object height | Angle β between central ray and optical axis | Half angle α of converging angle of rays | β/α |
|---|---|---|---|
|  | 10X position |  |  |
| 0% | 0.00 | 4.19° | 0.000 |
| 30% | 0.36 | 4.18° | 0.086 |
| 50% | 0.53 | 4.20° | 0.126 |
| 70% | 0.59 | 4.10° | 0.144 |

-continued

| Object height | Angle β between central ray and optical axis | Half angle α of converging angle of rays | β/α |
|---|---|---|---|
| 90% | 0.44 | 4.06° | 0.108 |
| 100% | 0.20 | 4.05° | 0.049 |
| 20X position | | | |
| 0% | 0.00 | 6.38° | 0.000 |
| 30% | −0.38 | 6.37° | −0.060 |
| 50% | −0.64 | 6.35° | −0.101 |
| 70% | −0.93 | 6.32° | −0.147 |
| 90% | −1.23 | 6.27° | −0.196 |
| 100% | −1.40 | 6.24° | −0.224 |
| 50X position | | | |
| 0% | 0.00 | 8.25° | 0.000 |
| 30% | −0.05 | 8.22° | −0.006 |
| 50% | −0.08 | 8.25° | −0.010 |
| 70% | −0.11 | 8.24° | −0.013 |
| 90% | −0.15 | 8.25° | −0.018 |
| 100% | −0.16 | 8.24° | −0.019 |

It will be understood from the tables in the above that the condition for attaining the telecentric character is fulfilled in Embodiment 1 shown in the above.

The table below shows the values of distance from the iris to the object surface and distance from the front focal point of the partial lens system consisting of the lens groups on the rear side of the iris to the object surface in the positions of respective magnifications.

| Position of magnification | Distance from iris to object surface | Distance from front focal point to object surface |
|---|---|---|
| 10X | 134.24 | 143.79 |
| 20X | 120.80 | 108.67 |
| 50X | 108.46 | 106.02 |

FIG. 11 shows the graphs illustrating the aberration curves of the zoom lens system according to Embodiment 1 in the positions of respective magnifications. As it is evident from these graphs, aberrations are corrected very favourably in spite of the fact that the vari-focal ratio is high and diameter of the front lens is small.

Embodiment 2

(Lens groups are numbered in the order from the screen side.)
Focal length: 104.51–20.25
Magnification: 10X–50X
Vari-focal ratio: 5.0 times
N.A.: 0.08–0.15 (10X–50X) Screen radius: 150 mm

| | | R | D | N | ν |
|---|---|---|---|---|---|
| 1 | Glass block | ∞ | 95.00 | 1.51633 | 64.1 |
| 2 | | ∞ | 11.00 | | |
| 3 | | 64.232 | 2.00 | 1.80518 | 25.4 |
| 4 | First lens group | 42.767 | 5.00 | 1.58913 | 61.1 |
| 5 | | 125.046 | 0.20 | | |
| 6 | | 38.508 | 5.00 | 1.60311 | 60.7 |
| 7 | | 100.553 | (*1) | | |
| 8 | | 44.178 | 1.00 | 1.77250 | 49.6 |
| 9 | | 20.042 | 2.50 | | |
| 10 | Second lens group | −921.261 | 1.00 | 1.80610 | 40.9 |
| 11 | | 35.452 | 2.00 | | |
| 12 | | −61.329 | 1.00 | 1.71300 | 53.9 |
| 13 | | 23.352 | 3.00 | 1.80518 | 25.4 |
| 14 | | −53.747 | (*2) | | |
| Iris → | | | | | |
| 15 | | 88.004 | 4.00 | 1.58913 | 61.1 |
| 16 | Third lens group | 23.672 | 1.00 | 1.80518 | 25.4 |
| 17 | | −238.708 | 0.20 | | |
| 18 | | 47.928 | 4.00 | 1.51633 | 61.1 |
| 19 | | −67.617 | (*3) | | |
| 20 | | 131.879 | 3.00 | 1.80518 | 25.4 |
| 21 | Fourth lens group | −52.369 | 1.50 | | 55.5 |
| 22 | | 28.163 | 6.00 | | |
| 23 | | −21.594 | 1.50 | 1.51633 | 64.1 |
| 24 | | −93.858 | (*4) | | |
| 25 | | 463.097 | 6.00 | 1.69680 | 55.5 |
| 26 | | −23.798 | 1.20 | 1.83400 | 37.2 |
| 27 | | −37.089 | 0.20 | | |
| 28 | Fifth lens group | 154.318 | 1.50 | 1.83400 | 37.2 |
| 29 | | 32.896 | 8.50 | 1.48749 | 70.1 |
| 30 | | −98.717 | 0.20 | | |
| 31 | | 40.043 | 5.80 | 1.71300 | 53.9 |
| 32 | | 225.010 | | | |

Distance between object and image: 1182.2 mm
Overall length of lens system: 255.0 mm
W.D. (including glass block): 50.0 mm
(*1)–(*4): Variables
Their values at respective magnifications are as shown below.

| | (*1) | (*2) | (*3) | (*4) |
|---|---|---|---|---|
| 10X (f = 104.51) | 23.17 | 17.00 | 39.53 | 1.50 |
| 20X (f = 53.47) | 20.01 | 32.49 | 18.24 | 10.47 |
| 50X (f = 20.25) | 1.50 | 53.55 | 3.58 | 12.57 |

The glass block means the prism.
R: Radius of curvature of lens surface
D: Thickness of lens or airspace between lenses
N: Refractive index of lens for d-line (wavelength: 587.56 nm)
ν: Abbe's number
In the lens system shown in the above, the iris is located at the position of 0.5 mm in front of the third lens group and moves integrally with the third lens group during variation of magnification.

$$\frac{f_3}{f_W} = 2.297 \quad \bar{n}_2 = 1.768$$

$$\frac{|f_2|}{f_W} = 1.400 \quad \bar{\nu}_5 = 50.8$$

$$\frac{|f_4|}{f_W} = 1.381$$

Figure 12:
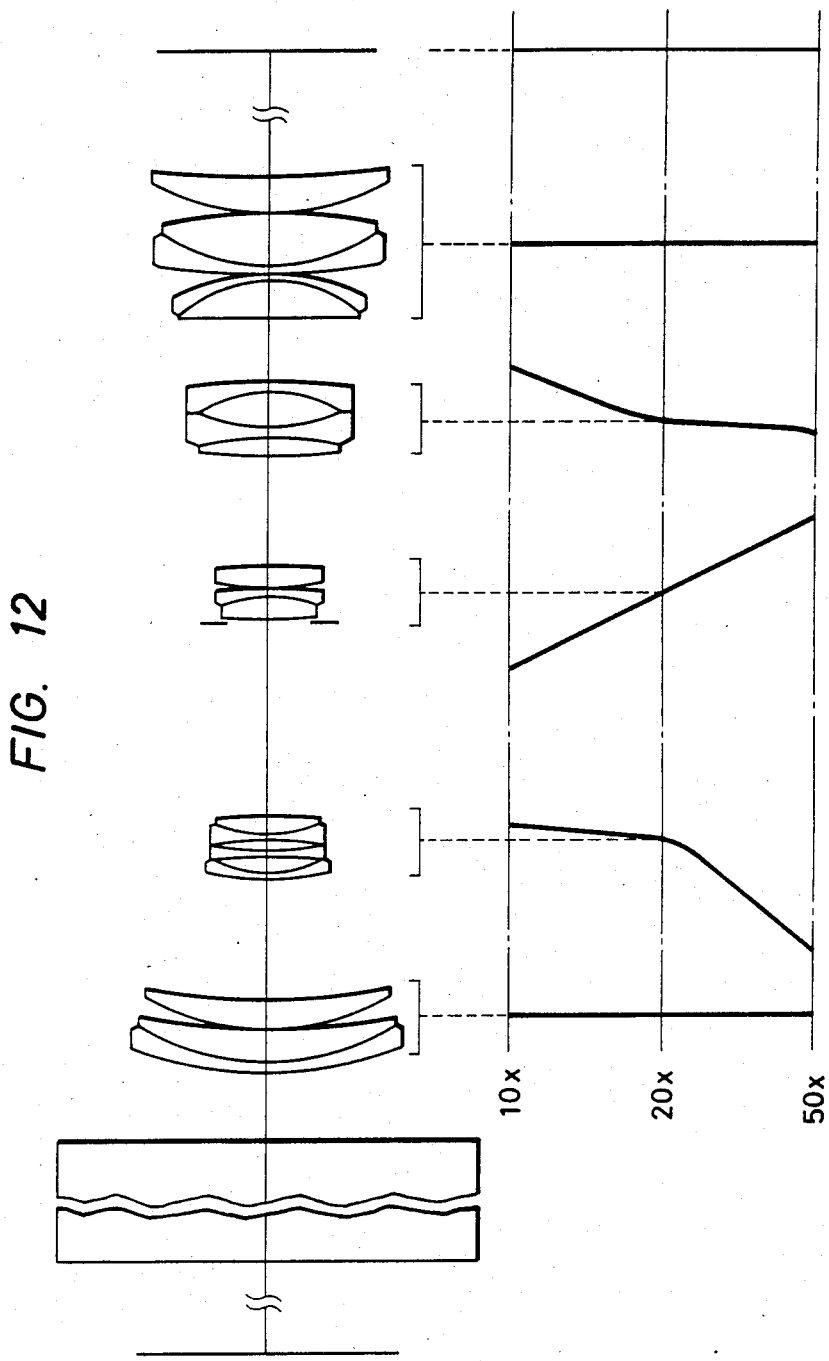

FIG. 12 shows a sectional view illustrating the lens configuration of the teleconcentric zoom lens system according to Embodiment 2 shown in the above and loci of movements of respective lens groups therein. FIG. 13 shows the states of optical paths of rays which come from the object heights of 0% (on the optical axis) and 100% on the object surface when the zoom lens system according to Embodiment 2 is in the positions of magnifications of 10X, 20X and 50X respectively. It will be understood from this figure that the condition for attaining the telecentric character is substantially fulfilled in the space on the object side compared with the positions of the front focal point of the partial lens system on the rear side of the iris shown by the dotted lines. FIG. 14 shows graphs illustrating the aberration curves of the zoom lens system according to Embodiment 2 in the positions of respective magnifications shown in the above. As it will be understood from these graphs, aberrations are corrected favourably in spite of the fact that this is a telecentric zoom lens system having a compact front lens, aperture efficiency of 100% and high vari-focal ratio of 5 times. Especially, distortion is favourably corrected to satisfactorily attain the level required for the optical systems for measuring projectors.

We claim:
1. A telecentric zoom lens system comprising at least one movable lens group arranged on a rear side of an iris, said movable lens group being movable along an optical axis thereof according to variation of magnifica- tion, means for maintaining the position of said iris near the front focal point of a partial lens system consisting of all lens elements arranged on said rear side corresponding to the movement of said movable lens group during variation of magnification, whereby a telecentric condition is always obtained.

2. A telecentric zoom lens system according to claim 1 wherein said partial lens system consists of said movable lens group, and said means maintains the position of said iris according to the following condition:

$$d = f$$

where, reference symbol d represents the distance between said iris and said lens group, and reference symbol f represents the focal length of said lens group.

3. A telecentric zoom lens system comprising a partial lens system which is arranged on a rear side of an iris, said partial lens system consisting of a first lens group and a second lens group, in the order from a position closer to said iris, at least one of which is movable along an optical axis thereof according to variation of magnification, means for maintaining the position of said iris according to the following condition:

$$d_1 = \frac{f_1(f_2 - d_2)}{f_1 + f_2 - d_2}$$

where,
$f_1$ = focal length of said first lens group
$f_2$ = focal length of said second lens group
$d_2$ = distance between said first lens group and second lens group.

4. A telecentric zoom lens system comprising partial lens system which is arranged on a rear side of an iris, said partial lens system consisting of a first lens group, a second lens group and a third lens group, in a order from a position closer to said iris, at least one of which is movable along an optical axis thereof according to variation of magnification, means for maintaining the position of said iris according to the following condition:

$$d_1 = \frac{f_1[(f_2 - d_2)(f_3 - d_3) - f_2 d_2]}{f_2(f_1 - d_2) + (f_3 - d_3)(f_1 + f_2 - d_2)}$$

where,
$f_i$ = focal length of said $i^{th}$ lens group
$d_i$ = distance between $2^{th}$ lens group and $(i+1)$th lens group.

5. A telecentric zoom lens system comprising a first positive lens group, a second negative lens group, and partial lens system which consists of a third positive lens group, a fourth negative lens group and a fifth positive lens group, said first lens group and said fifth lens group being kept fixed during variation of magnification, said second lens group and said fourth lens group being moved toward said first lens group according to variation of magnification from the long focal length position toward the short focal length position, said third lens group being moved toward said fifth lens group according to variation of magnification from the long focal length position toward the short focal length position, means for fixing an iris to said third lens group, and means for maintaining said partial lens system to form a front focal point thereof near said iris during said variation.

6. A telecentric zoom lens system which is adapted to satisfy the follwing conditions:

$$|\beta|/\alpha < 0.5$$

where,
$\alpha$ = half angle of converging angle of rays in the meridional section of said rays in the space on the object side or space on the image side for attaining the telecentric condition,
$\beta$ = angle between the central ray that equally bisects said converging angle of said rays, said telecentric zoom lens system comprising at least one movable lens group arranged on a rear side of an iris, said movable lens group being movable along an optical axis thereof according to variation of magnification, means for maintaining the position of said iris near the front focal point of partial lens system consisting of all lens elements arranged on said rear side corresponding to the movement of said movable lens group during variation of magnification, whereby a telecentric condition is always obtained.

7. A telecentric zoom lens system comprising a first positive lens group, a second negative lens group, a third positive lens group, a fourth negative lens group and a fifth positive lens group, said first lens group and said fifth lens group being kept fixed during variation of magnification, said second lens group and said fourth lens group being moved toward said first lens groups, said third lens group being moved toward said fifth lens group according to variation of magnification from the long focal length position toward the short focal length position, and said telecentric zoom lens system being arranged to further fulfill the following conditions:

$$1.5 < f_3/f_W < 3.0$$

$$1.0 < |f_2|/f_W < 2.0$$

$$1.0 < |f_4|/f_W < 2.0$$

where,
$f_w$: focal length of the zoom lens system as a whole in the short focal length position (wide position),
$f_i$: focal length of $i^{th}$ lens group.

8. A telecentric zoom lens system comprising a first positive lens group, a second negative lens group, a third positive lens group, a fourth negative lens group and a fifth positive lens group, said first lens group and said fifth lens group being kept fixed during variation of magnification, said second lens group and said fourth lens group being moved toward said first lens group and said third lens group being moved toward said fifth lens group according to variation of magnification from the long focal length position, said first lens group comprises a doublet and a positive single lens, said doublet consisting of a positive single lens and a negative single lens; said second lens group comprises at least two negative single lenses and a doublet, said doublet consisting of a positive single lens and a negative single lens; said third lens group comprises a doublet and a positive single lens, said doublet consisting of a positive single lens and a negative single lens; said fourth lens group comprises a doublet and a negative single lens, said doublet consisting of a positive single lens and a negative single lens; and said fifth lens group comprises at least two doublets and a positive single lens, each of said doublet consisting of a positive single lens and a negative single lens; said telecentric zoom lens system being arranged to further fulfill the following conditions:

$$\bar{n}_2 > 1.75$$

$$\bar{\nu}_5 > 45$$

where,
$\bar{n}_2$: mean value of refractive indices of lenses constituting said second lens group
$\bar{\nu}_5$: mean value of Abbe's numbers of lenses constituting said fifth lens group.

9. A telecentric zoom lens system according to claim 8 wherein said telecentric zoom lens system has the numerical data shown below:

Numerical data:
(Lens groups are numbered in the order from the screen side)
Focal length: 104.05–20.06
Magnification: 10X–50X
Vari-focal ratio: 5.0 times
N.A.: 0.07–0.14 (10X–50X)
Screen radius: 150 mm

|  |  | R | D | N | ν |
|---|---|---|---|---|---|
| 1 | Glass block | ∞ | 107.00 | 1.51633 | 64.1 |
| 2 |  | ∞ | 17.22 |  |  |
| 3 |  | 64.845 | 1.70 | 1.80518 | 25.4 |
| 4 |  | 42.390 | 4.93 | 1.58913 | 61.1 |
| 5 | First lens | 140.576 | 0.20 |  |  |
| 6 | group | 41.085 | 4.80 | 1.58913 | 61.1 |
| 7 |  | 114.332 | (*1) |  |  |
| 8 |  | 46.393 | 1.00 | 1.77250 | 49.6 |
| 9 |  | 20.590 | 2.30 |  |  |
| 10 |  | −352.160 | 0.97 | 1.80610 | 40.9 |
| 11 | Second lens | 34.774 | 1.90 |  |  |
| 12 | group | −62.194 | 1.00 | 1.71300 | 53.9 |
| 13 |  | 23.120 | 3.30 | 1.80518 | 25.4 |
| 14 |  | −54.372 | (*2) |  |  |
| Iris→ |  |  |  |  |  |
| 15 |  | 81.608 | 2.50 | 1.58918 | 61.1 |
| 16 |  | −24.500 | 1.10 | 1.80518 | 25.4 |
| 17 | Third lens | −165.546 | 0.20 |  |  |
| 18 | group | 48.618 | 2.73 | 1.51633 | 64.1 |
| 19 |  | −59.558 | (*3) |  |  |
| 20 |  | 108.070 | 2.82 | 1.80518 | 25.4 |
| 21 |  | −51.916 | 1.30 | 1.71300 | 53.9 |
| 22 | Fourth lens | 28.798 | 5.50 |  |  |
| 23 | group | −20.844 | 1.30 | 1.58913 | 61.1 |
| 24 |  | −62.310 | (*4) |  |  |
| 25 |  | 883.446 | 6.10 | 1.71300 | 53.9 |
| 26 |  | −23.908 | 1.20 | 1.83400 | 37.2 |
| 27 |  | −36.694 | 0.20 |  |  |
| 28 |  | 200.244 | 1.20 | 1.83400 | 37.2 |
| 29 | Fifth lens | 31.183 | 7.60 | 1.48749 | 70.1 |
| 30 | group | −99.761 | 0.20 |  |  |
| 31 |  | 38.744 | 5.50 | 1.69680 | 55.5 |
| 32 |  | 239.719 |  |  |  |

Distance between the object and image: 1186.4 mm
Overall length of the zoom lens system: 272.4 mm
W.D. (including the glass block): 50.6 mm
(*1)–(*4): Variables
Their values at respective magnifications are as shown below,:

|  | (*1) | (*2) | (*3) | (*4) |
|---|---|---|---|---|
| 10X (f = 104.05) | 24.50 | 18.94 | 41.44 | 2.25 |
| 20X (f = 53.45) | 21.40 | 35.49 | 19.45 | 10.80 |
| 50X (f = 20.06) | 3.45 | 65.77 | 4.09 | 13.82 |

The glass block means the prism,
R: Radius of curvature of lens surface
D: Thickness of lens or airspaces between lenses
N: Refractive index of lens for d-line (wavelength: 587.56 nm)
ν: Abbe's number
In the zoom lens system shown in the above, the iris is located at the position of 0.5 mm in front of the third lens group and moves integrally with the third lens group during variation of magnification.

10. A telecentric zoom lens system according to claim 8 wherein said telecentric zoom lens system has the numerical data shown below:

Numerical data:
(Lens groups are numbered in the order from the screen side)
Focal length: 104.51–20.25
Magnification: 10X–50X
Vari-focal ratio: 5.0 times
N.A.: 0.08–0.15 (10X–50X)
Screen radius: 150 mm

|  |  | R | D | N | ν |
|---|---|---|---|---|---|
| 1 | Glass block | ∞ | 95.00 | 1.51633 | 64.1 |
| 2 |  | ∞ | 11.00 |  |  |
| 3 |  | 64.232 | 2.00 | 1.80518 | 25.4 |
| 4 |  | 42.767 | 5.00 | 1.58913 | 61.1 |
| 5 | First lens | 125.046 | 0.20 |  |  |
| 6 | group | 38.508 | 5.00 | 1.60311 | 60.7 |
| 7 |  | 100.553 | (*1) |  |  |
| 8 |  | 44.178 | 1.00 | 1.77250 | 49.6 |
| 9 |  | 20.042 | 2.50 |  |  |
| 10 |  | −921.261 | 1.00 | 1.80610 | 40.9 |
| 11 | Second lens | 35.452 | 2.00 |  |  |
| 12 | group | −61.329 | 1.00 | 1.71300 | 53.9 |
| 13 |  | 23.352 | 3.00 | 1.80518 | 25.4 |
| 14 |  | −53.747 | (*2) |  |  |
| Iris→ |  |  |  |  |  |
| 15 |  | 88.004 | 4.00 | 1.58913 | 61.1 |
| 16 |  | 23.672 | 1.00 | 1.80518 | 25.4 |
| 17 | Third lens | −238.708 | 0.20 |  |  |
| 18 | group | 47.928 | 4.00 | 1.51633 | 61.1 |
| 19 |  | −67.617 | (*3) |  |  |
| 20 |  | 131.879 | 3.00 | 1.80518 | 25.4 |
| 21 |  | −52.369 | 1.50 |  | 55.5 |
| 22 | Fourth lens | 28.163 | 6.00 |  |  |
| 23 | group | −21.594 | 1.50 | 1.51633 | 64.1 |
| 24 |  | −93.858 | (*4) |  |  |
| 25 |  | 463.097 | 6.00 | 1.69680 | 55.5 |
| 26 |  | −23.798 | 1.20 | 1.83400 | 37.2 |
| 27 |  | −37.089 | 0.20 |  |  |
| 28 |  | 154.318 | 1.50 | 1.83400 | 37.2 |
| 29 | Fifth lens | 32.896 | 8.50 | 1.48749 | 70.1 |
| 30 | group | −98.717 | 0.20 |  |  |
| 31 |  | 40.043 | 5.80 | 1.71300 | 53.9 |
| 32 |  | 225.010 |  |  |  |

Distance between the object and image: 1182.2 mm
Overall length of the zoom lens system: 255.0 mm
W.D. (including the glass block): 50.0 mm
(*1)–(*4): Variables
Their values at respective magnifications are as shown below,:

|  | (*1) | (*2) | (*3) | (*4) |
|---|---|---|---|---|
| 10X (f = 104.51) | 23.17 | 17.00 | 39.53 | 1.50 |
| 20X (f = 53.47) | 20.01 | 32.49 | 18.24 | 10.47 |
| 50X (f = 20.25) | 1.50 | 53.55 | 3.58 | 12.57 |

The glass block means the prism,
R: Radius of curvature of lens surface
D: Thickness of lens or airspaces between lenses
N: Refractive index of lens for d-line (wavelength: 587.56 nm)
ν: Abbe's number
In the zoom lens system shown in the above, the iris is located at the position of 0.5 mm in front of the third lens group and moves integrally with the third lens group during variation of magnification.

* * * * *